US012113351B2

(12) United States Patent
Leavitt

(10) Patent No.: US 12,113,351 B2
(45) Date of Patent: Oct. 8, 2024

(54) CIRCUIT BREAKER HAVING A CURRENT SENSING CIRCUIT, CONTROL CIRCUIT, COMPARISON CIRCUIT, ELECTRIC RELAY AND LATCHING CIRCUIT

(71) Applicant: Dallen Tate Leavitt, Calgary (CA)

(72) Inventor: Dallen Tate Leavitt, Calgary (CA)

(73) Assignee: Gemstone Lights, Calgary (CA)

( * ) Notice: Subject to any disclaimer, the term of this patent is extended or adjusted under 35 U.S.C. 154(b) by 193 days.

(21) Appl. No.: 17/845,064

(22) Filed: Jun. 21, 2022

(65) Prior Publication Data

US 2023/0411951 A1 Dec. 21, 2023

(51) Int. Cl.
*H02H 3/20* (2006.01)
*H02H 1/00* (2006.01)

(52) U.S. Cl.
CPC ............ *H02H 3/20* (2013.01); *H02H 1/0007* (2013.01)

(58) Field of Classification Search
CPC ............................... H02H 1/0007; H02H 3/20
See application file for complete search history.

(56) References Cited

U.S. PATENT DOCUMENTS 4,544,980 A * 10/1985 Serrie ...................... H02H 3/33 361/45
6,788,515 B1 9/2004 Martin
7,742,273 B1 6/2010 Shvartsman et al.
8,618,775 B2 12/2013 Hermann et al.
9,484,737 B2 11/2016 Kim et al.
2014/0354288 A1* 12/2014 Seon ........................ H02H 3/08 324/424
2016/0187409 A1* 6/2016 Kolker ................ H02H 1/0015 361/42
2022/0376489 A1* 11/2022 Kim ...................... H02J 7/0031

FOREIGN PATENT DOCUMENTS

| | | | |
|---|---|---|---|
| CN | 1040929 | C | 11/1998 |
| CN | 107093887 | A | 8/2017 |
| CN | 207800477 | U | 8/2018 |
| CN | 211402517 | U | 9/2020 |
| CN | 112802716 | A | 5/2021 |
| CN | 215528979 | U | 1/2022 |
| JP | 10155270 | A | 6/1998 |
| JP | 2007209114 | A | 8/2007 |
| JP | 2009171769 | A | 7/2009 |
| JP | 201098798 | A | 4/2010 |
| JP | 201399027 | A | 5/2013 |

OTHER PUBLICATIONS

Maxim Integrated Products, Inc., www.maximintegrated.com, "MAX20766 Smart Slave IC with Integrated Current and Temperature Sensors", Dec. 2017.

* cited by examiner

*Primary Examiner* — Jared Fureman
*Assistant Examiner* — Nicolas Bellido
(74) *Attorney, Agent, or Firm* — Levenfeld Pearlstein, LLC

(57) ABSTRACT

A circuit breaker for protecting against a short circuit and over current. The circuit breaker includes a current sensing circuit configured to determine an input voltage. The circuit breaker also includes a control circuit configured to set a threshold voltage. The circuit breaker further includes a comparison circuit configured to compare the input voltage to the threshold voltage. The circuit breaker, in addition, includes a voltage output circuit configured to output an output voltage based on the comparison circuit.

9 Claims, 3 Drawing Sheets

CIRCUIT BREAKER HAVING A CURRENT SENSING CIRCUIT, CONTROL CIRCUIT, COMPARISON CIRCUIT, ELECTRIC RELAY AND LATCHING CIRCUIT

BACKGROUND

This disclosure is related to a self-protecting circuit breaker.

Power circuits may experience overcurrent shots resulting from a short circuit or other electric faults. A short circuit occurs when a current travels along an unintended path with no or very low electrical impedance. This results in an excessive current flowing through the circuit. An overcurrent or excess current occurs when a larger than intended electric current exists through a conductor, leading to excessive generation of heat, and the risk of fire or damage to the electrical equipment.

Fuses, circuit breakers, and current limiters are commonly used overcurrent protection (OCP) mechanisms to control the risks. A fuse operates to provide overcurrent protection of an electrical circuit. Its essential component is a metal wire or strip that melts when too much current flows through it, thereby stopping or interrupting the current. Circuit breakers operate by interrupting current flow to protect equipment and to prevent the risk of fire. Unlike a fuse, which operates once and then must be replaced, a circuit breaker can be reset (either manually or automatically) to resume normal operation.

Currently, different automatic circuit breakers exist. For example, power circuit breakers may have electric motor operators so they can open and close under remote control. Other circuit breakers include reclosers (close automatically after a delay) and polyswitches (automatically reset based on temperature levels). Polyswitches include Polymer Positive Temperature Coefficient (PPTC) auto-recovery fuses that are used to protect against short circuits and over-current. However, the ambient temperature has a large impact on PPTC auto-recovery fuses as they operate based on temperature levels. Other fast protective fuses cut themselves off when overcurrent occurs, but they do not have an auto-recover feature and therefore, they must be replaced.

Accordingly, it is desirable to provide an improved circuit breaker.

BRIEF SUMMARY

A circuit breaker is provided according to various embodiments.

In one aspect, the circuit breaker may include a current sensing circuit configured to determine an input voltage. The circuit breaker may also include a control circuit configured to set a threshold voltage. The circuit breaker may further include a comparison circuit configured to compare the input voltage to the threshold voltage. The circuit breaker may, in addition, include a voltage output circuit configured to output an output voltage based on the comparison circuit.

The foregoing general description and the following detailed description are examples only and are not restrictive of the present disclosure.

BRIEF DESCRIPTION OF THE DRAWINGS

The benefits and advantages of the present embodiments will become more readily apparent to those of ordinary skill in the relevant art after reviewing the following detailed description and accompanying drawings, wherein.

DETAILED DESCRIPTION

Figure 1:
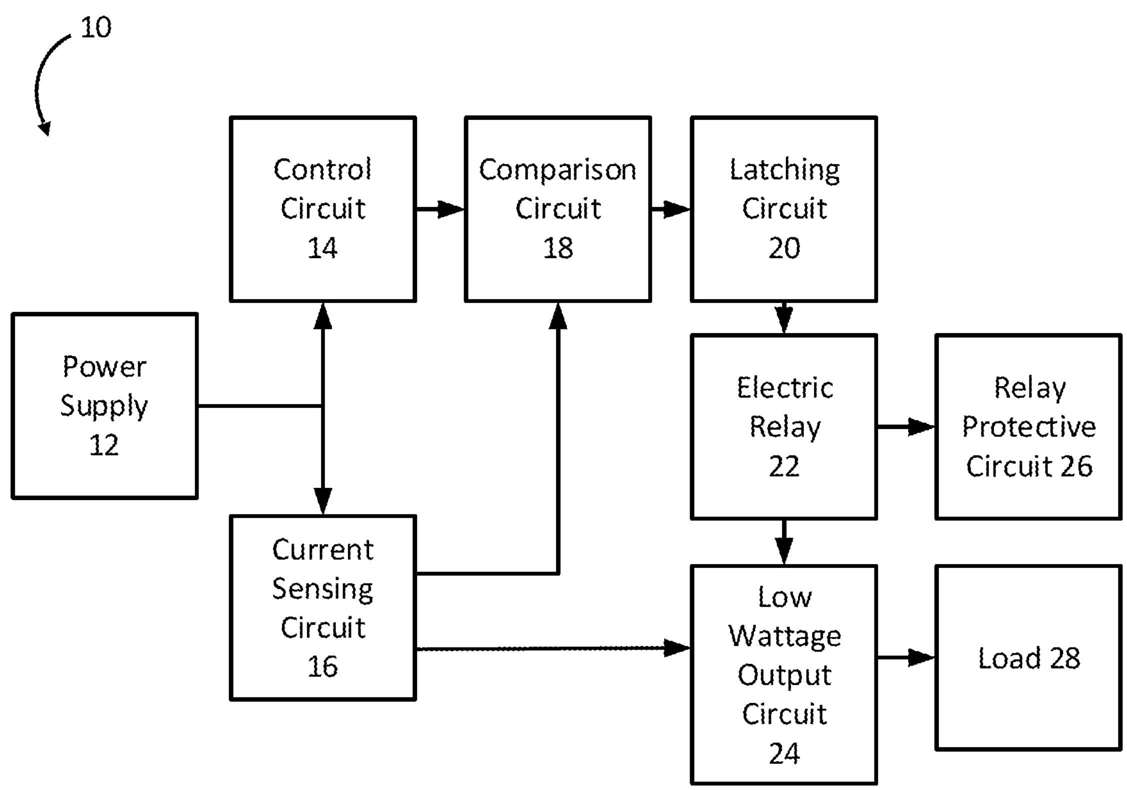
FIG. 1 shows an illustration of a circuit breaker according to an embodiment.

While the present disclosure is susceptible of embodiment in various forms, there is shown in the drawings and will hereinafter be described presently preferred embodiments with the understanding that the present disclosure is to be considered an exemplification and is not intended to limit the disclosure to the specific embodiments illustrated. The words "a" or "an" are to be taken to include both the singular and the plural. Conversely, any reference to plural items shall, where appropriate, include the singular.

Figure 2:
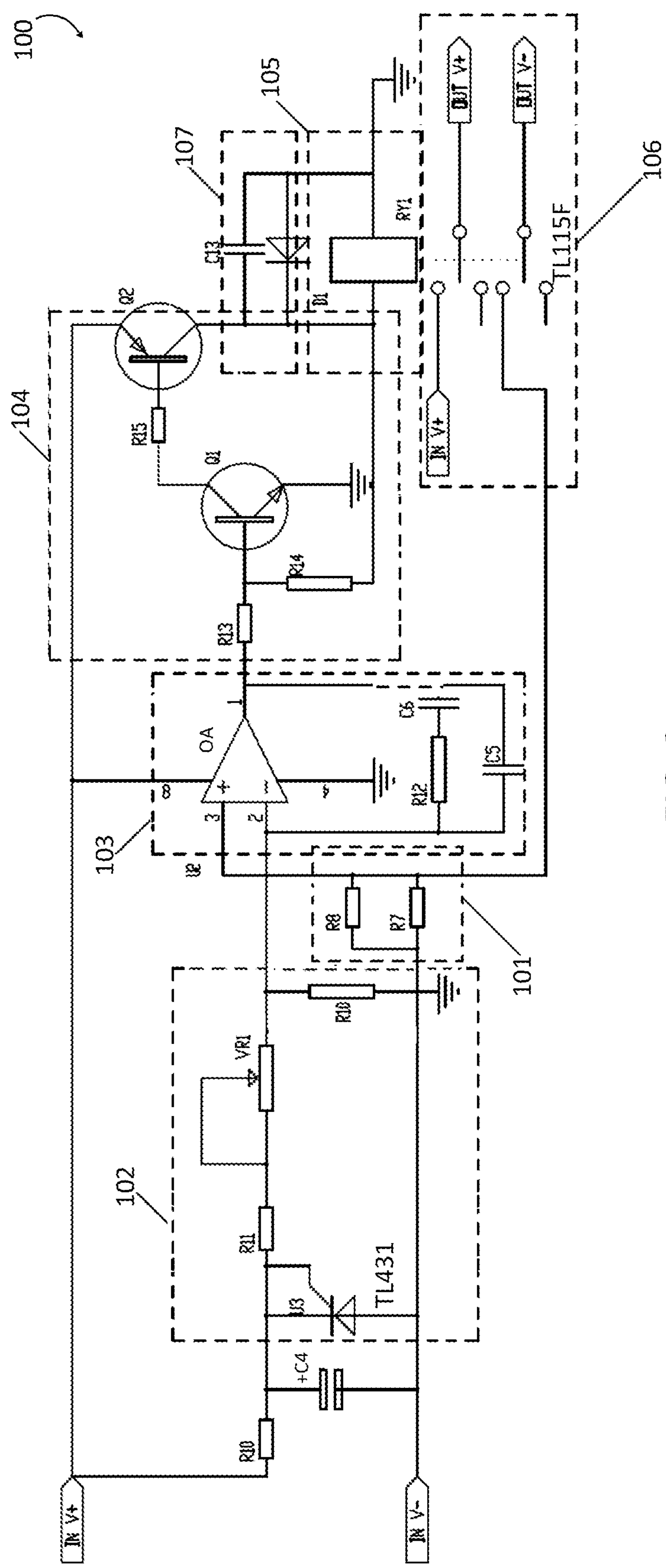
FIG. 2 shows a schematic of a circuit breaker according to an embodiment.
Figure 3:
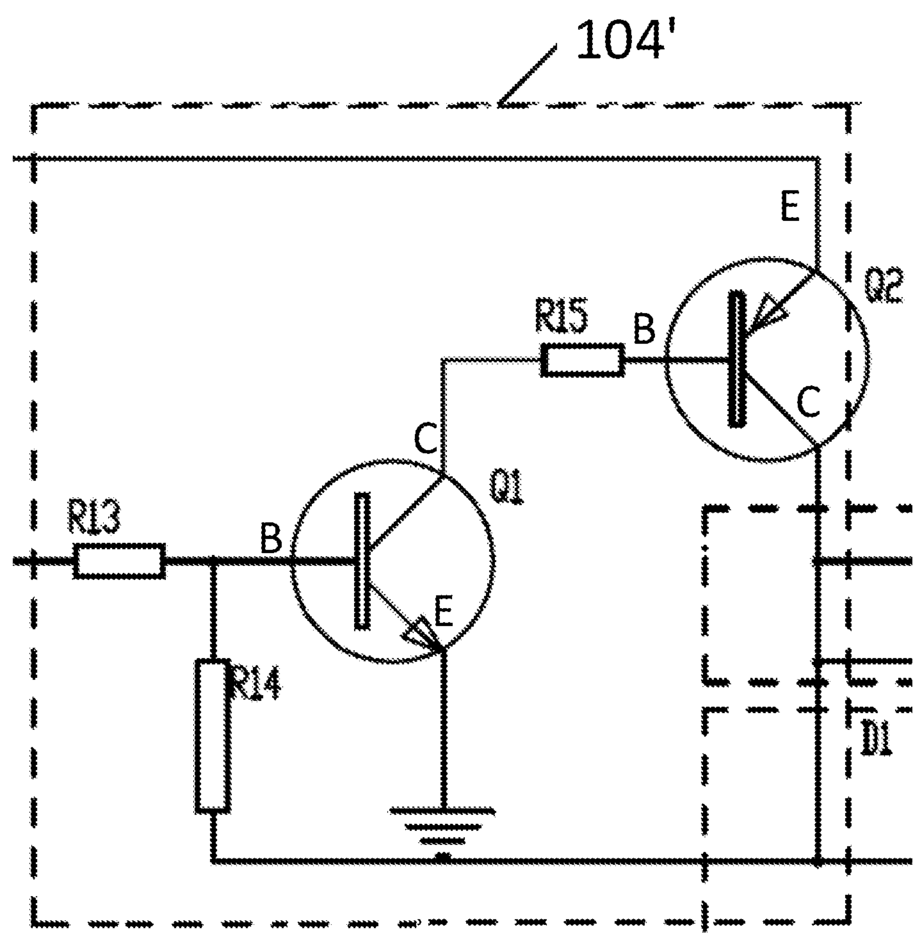
FIG. 3 shows a schematic of a latch circuit of the circuit breaker of FIG. 2.

Referring now to the figures, FIGS. 1, 2, and 3 show a self-protective circuit breaker 10 according to multiple embodiments. The self-protective circuit breaker 10 works to protect against an overcurrent short resulting from a short circuit. The self-protective circuit breaker 10 may include a power supply 12, control circuit 14, current sensing circuit 16, comparison circuit 18, latching circuit 20, electric relay 22, low wattage output circuit 24, relay protective circuit 26, and load 28.

The current sensing circuit 16 determines an input voltage provided by the power supply 12. The control circuit 14 sets a threshold voltage. The comparison circuit 18 compares the input voltage to the threshold voltage. The latch circuit 20 controls the electric relay 22 which opens and closes the low-wattage output circuit 24 to provide an output voltage based on the comparison of the input voltage and the threshold voltage. The low wattage output circuit 24 is open when the input voltage is less than the threshold voltage and closed when the input voltage is greater than the threshold voltage. The relay protective circuit 26 protects the electric relay 22 by consuming extra voltage produced when the electric relay 22 closes the low wattage output circuit 24. Therefore, the self-protective circuit 10 provides a voltage output to load 28 when the input voltage is less than the threshold voltage and the low wattage output circuit 24 is open.

In an embodiment, the threshold voltage is set using an adjustable resistor and the self-protective circuit has a +/−5% tolerance and can quickly reset. The current sensing circuit 16, for example, may be set to 9.6 A max current.

FIG. 2 shows a self-protective circuit breaker 100 according to an embodiment. The self-protective circuit breaker 100 includes a current sensing circuit 101 that determines the input voltage U, a control circuit 102 that sets a threshold voltage U1, a comparison circuit 103 that compares the input voltage U to the threshold voltage U1, a latch circuit 104 that controls an electric relay 105 which opens and closes a voltage output circuit 106 based on the comparison circuit 103, and a protective circuit 107 for electric relay 105 that consumes extra voltage produced when the electric relay 105 is closed. The self-protective circuit, through the voltage output circuit 106, provides a voltage output when the input voltage U is less than the threshold voltage U1. The self-protective circuit, through the protective circuit 107 for electric relay 105, consumes the extra voltage and does not output a voltage at the voltage output circuit 106 when the input voltage U is greater than the threshold voltage U1. The threshold voltage U1 is set using an adjustable resistor VR1 and the self-protective circuit has a +/−5% tolerance that can quickly reset.

In an embodiment, the current sensing circuit 101 has a direct current (DC) voltage input from a power supply and the power supply may be part of a power kit. The output of the current sensing circuit may drive external devices, for example, a controller or lights like light-emitting diodes (LEDs).

The current sensing circuit 101 includes resistors R7 and R8 that have a voltage based on the current that comes through the resistors. The voltage U can be calculated based on Ohm's law (U=I*R), where a higher current will result in a higher voltage difference while R7 and R8 are fixed. The voltage U can be used as a comparison voltage for the comparison circuit 103.

The control circuit 102 includes a voltage regulator TL431, resistor R11 (upwards bias), variable resistor VR1 (upwards bias) and R10 (downwards bias). The control circuit 102 sets the threshold voltage U1 based on the settings of the variable resistor VR1.

In an embodiment, if the current I is equal to 9.7 A and R7 and R8 have a resistance of the voltage U will be 9.7 A (I)*0.1Ω(R)=0.097V. The comparison circuit 103 will compare the voltage U from the current sensing circuit 101 with the threshold voltage U1 set by the control circuit 102.

In an embodiment, the threshold voltage U1=(R10/Rtotal)*U3, where Rtotal=total value added with R11=15 kΩ, VR1=10 kΩ, and R10=1 kΩ, U3 is the settled voltage of the voltage regulator TL431, for example, 2.5V. Thus, the threshold voltage U1 can be set to 0.096V as U1=(1/(15+10+1))*2.5V=0.096V.

The variable resistor VR1 may be a potentiometer that can be adjusted to change the threshold voltage U1 and thus setting a max input current before the self-protective circuit breaker 100 cuts off and protects the overall system.

The comparison circuit 103 includes an op-amp comparator OA, resistor R12, and capacitors C5 and C6 electrical leads. The op-amp comparator OA's input lead 3 has the input voltage U from the current sensing circuit 101 and the input lead 2 has the threshold voltage U1 from the control circuit 102. The op-amp comparator OA will compare the difference between the input voltage U and the threshold voltage U1.

In an embodiment, when U>U1, the output lead 1 of the op-amp comparator OA is in high mode and when U<U1, the op-amp comparator OA is in low mode.

Latching circuit 104 includes NPN styled triode Q1 and PNP styled triode Q2. Each triode has 3 leads (base, collector, emitter, as shown in FIG. 3). The base lead of the triode Q1 is connected to the output of comparison circuit 103. The emitter lead of the triode Q1 is grounded. The collector lead of the triode Q1 is connected to the base lead of the triode Q2. The emitter lead of the triode Q2 is connected to the power supply. The base lead of the triode Q1 converges with the collector lead of the triode Q2 at one conjunction and then outputs to the electric relay 105.

In an embodiment, the electric relay 105 includes an electric relay RY1.

In an embodiment, when the comparison circuit 103 is at high mode (U>U1), the base lead of the triode Q1 is also at high mode and thus resulting in the break-over (conducting) of the triode Q1. Also, the base lead of the triode Q2 is at high mode and the triode Q2 is at break-over (conducting). This results in the high mode of the latch circuit 104 output and the electric relay RY1 being activated.

In an embodiment, the electric relay RY1 is normally not activated and closed and when activated, it moves to an open state. When the electric relay RY1 is closed it is conducting and when it becomes open it is disconnected. In operation, the electric relay RY1 is closed when U<U1 and the electric relay RY1 is activated (becomes open) when U>U1 and cuts off the output preventing electricity from going to a load via voltage output circuit 106.

In another embodiment, the electric relay RY1 is normally activated and closed, and when not activated, it moves to an open state. In operation, the electric relay RY1 is closed when U<U1 and the electric relay RY1 is activated (becomes open) when U>U1 and cuts off the output preventing electricity from going to a load via voltage output circuit 106.

The voltage output circuit 106 is a low wattage circuit which consist of output terminals (v+v− which are open/disconnected) between load and power supply. The electric relay RY1 is used to control the open or close state of the terminals in the voltage output circuit 106. When the electric relay RY1 is activated/disconnected, there is no output to the load and when the electric relay RY1 is deactivated, electricity moves to the load via the normally closed the electric relay RY1.

In an embodiment, the electric relay RY1 includes a TL115F relay.

The protective circuit 107 includes a protective capacitor C13 and a diode D1, which are connected in parallel. The protective circuit 107 protects electric relay 105, which is connected in parallel, by consuming the extra energy/voltage produced at the moment when electric relay RY1 is activated, as there will be a large increase in voltage at both ends of the relay when the relay opens/disconnects suddenly.

The protective circuit 107 further protects the system from the voltage increase feeding back to the NPN styled triode Q1 of the comparison circuit 103, resulting in a comparison misread (U<U1) and causing the voltage output circuit 106 to shift between open and close as feedback occurs.

Thus, the self-protecting circuit breaker 100 may be set to, for example, a max current of 9.6 A, or it can be adjusted to a higher or lower current by adjusting the variable resistor VR1. The self-protective circuit breaker 100 can accomplish a +/−5% tolerance and does not depend on temperature levels for resetting.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A circuit breaker comprising:

a current sensing circuit configured to determine an input voltage;

a control circuit configured to set a threshold voltage;

a comparison circuit configured to compare the input voltage to the threshold voltage; and a voltage output circuit configured to output an output voltage based on an output of the comparison circuit, further comprising, a latching circuit configured to control an electric relay based on the output of the comparison circuit;

the electric relay configured to open and close the voltage output circuit based on an output of the latching circuit; and the voltage output circuit configured to output the output voltage based on an output of the electric relay.

2. The circuit breaker of claim 1, further comprising:

a protective circuit configured to consume extra voltage produced when the electric relay is closed.

3. The circuit breaker of claim 1, wherein the latching circuit comprises a NPN styled triode and a PNP styled triode.

4. The circuit breaker of claim 1, wherein the latching circuit is configured to open the electric relay when the input voltage is greater than the threshold voltage and to close the electric relay when the input voltage is less than the threshold voltage.

5. The circuit breaker of claim 1, wherein the latching circuit is configured to an accuracy tolerance of +/−5% of rated current.

6. The circuit breaker of claim 1, wherein the control circuit comprises an adjustable resistor configured to set the threshold voltage.

7. The circuit breaker of claim 1, wherein the voltage output circuit outputs the output voltage when the comparison circuit determines that the input voltage is less than the threshold voltage.

8. The circuit breaker of claim 1, wherein the voltage output circuit is cut off when the comparison circuit determines that the input voltage is greater than the threshold voltage.

9. The circuit breaker of claim 1, wherein the voltage output circuit comprises a low wattage circuit.

* * * * *